2,947,706

PROCESS FOR REGENERATING CATALYSTS USED IN THE SYNTHESIS OF ACRYLO-NITRILE

Wilhelm Müller and Johannes Casper, Leverkusen, and Rudolf Haupt and Josef Heinen, Leverkusen-Bayerwerk, Germany, assignors to Farbenfabriken Bayer Aktiengesellschaft, Leverkusen, Germany, a corporation of Germany No Drawing. Filed Oct. 31, 1957, Ser. No. 693,521

Claims priority, application Germany Nov. 5, 1956

1 Claim. (Cl. 252—416)

The present invention relates to an improvement in the recovery and reactivation of spent cuprous chloride ctalysts used in the production of acrylonitrile by the reaction of acetylene with hydrocyanic acid.

It is known that acrylonitrile can be synthesized from acetylene and hydrocyanic acid in the presence of acid cuprous chloride solutions which also contain alkali metal salts, for example potassium chloride and/or sodium chloride and/or ammonium chloride, as solution promoters (see German patent specification No. 728,767). This process has the disadvantage however that the activity of the catalyst becomes weaker in the course of time owing to the formation of resins and ammonium salts.

It has now been found that such a catalyst, inactivated owing to the formation of resins and ammonium salts, can be regenerated particularly advantageously by first of all dehydrating the catalyst and then drawing off the liquid resins at an elevated temperature or burning them off with an oxidizing flame.

The process of the invention is based on our discovery that the solubility of the resins in the catalyst decreases with decreasing water and acid content and that the resins are practically insoluble in the anhydrous cuprous chloride catalyst. If a dehydrated catalyst is heated to temperatures of approximately 160–200° C., the residue forms a viscous melt from which the resins formed as impurities separate as a mobile oil on the surface of the catalyst melt, which can be removed therefrom in very many different ways. This mobile oil can for example be decanted from the melt, whereafter it is preferably freed by conventional methods from any residual cuprous chloride contained therein. Cuprous chloride can then be added to the purified cuprous chloride catalyst solution containing the above promoters which is left as a viscous melt, to reproduce the original ratio between cuprous chloride and solution promoter.

In one preferred embodiment of the process of the invention, however, the resins which separate out on the viscous catalyst melt are burnt away with an oxidizing flame. In this case, the ammonium salts also formed as a secondary product come off in vapor form, so that a melt is left consisting of cuprous chloride and the alkali metal salt in the proportions originally used as catalyst. By dissolving this melt in water, if necessary filtering, and acidifying with hydrochloric acid, a catalyst solution is obtained with an activity which corresponds to that of the solution originally used.

In another preferred embodiment of the process of the invention, regeneration of the cuprous chloride catalyst is carried out by causing the catalyst to be regenerated to flow through a rotary furnace in which a highly oxidizing flame is burning. The catalyst is dehydrated in the upper part of the rotary furnace, provision being made, preferably by installation of baffle members, for the dehydration of the catalyst solution to take place over the shortest possible distance. With increasing dehydration a film is formed on the walls of the furnace, with a thickness corresponding to the viscosity of the anhydrous catalyst melt, and the resins separate out as a thin film thereon, this resin film then being burnt away by the oxidizing flame. Temperatures from 200–500° C., preferably 300–450° C. can be used as reaction temperatures. It is generally advantageous if the oxidizing flame has a relatively high oxygen content. The residues from the combustion simultaneously protect the catalyst melt from oxidation, so that even when the excess of oxygen in the flame is a maximum there is practically no oxidation of the monovalent copper contained in the melt to form divalent copper. On the other hand, with insufficient oxygen, the burning of the resins is incomplete, and corresponding amounts of coke are formed, which can partially reduce the monovalent copper contained in the catalyst melt to metallic copper, particularly at temperatures higher than 400° C.

The process of the invention enables the original activity of the inactivated cuprous chloride catalyst to be simply reproduced. Furthermore, in the regeneration, a product is obtained which contains the cuprous chloride and the alkali metal halide serving as solution promoter in the original proportions, so that the regenerated catalyst is ready for use again immediately after it has been dissolved in water and the solution acidified.

The following examples further illustrate the invention without, in any way, limiting it thereto.

*Example 1*

A freshly prepared catalyst solution for the synthesis of acrylonitrile from acetylene and hydrocyanic acid, which solution contains 6.3 mols of cuprous chloride, 5.5 mols of potassium chloride and 0.6 mol of sodium chloride per liter, has an initial capacity, under the prevailing reaction conditions, of 40 g. of acrylonitrile per hour and per kg. of copper. In the course of time, this capacity gradually falls to 20 g. of acrylonitrile per hour and per kg. of copper owing to formation of resins and ammonium salts.

35 liters of such an inactivated catalyst solution are heated in an open copper pot with a capacity of 50 liters. As the temperature gradually rises, HCl, HCN and to an increasing degree ammonium salts escape in addition to water, and these substances are drawn off by suction. When an internal temperature of approximately 160–200° C. has been reached, all the water is driven off and the resin separates out in the form of a brownish-black oil on the viscous melt which is obtained, but this oil still has copper-containing crystals in suspension. This oil can then be removed by decanting off, and a catalyst solution prepared as described below. If necessary, there is added such an amount of cuprous chloride as is necessary to obtain the original proportions of cuprous chloride and solution promoters.

In the preferred process the aforementioned melt is further heated. At temperatures of approximately 250° C., the oil starts to decompose. The oil is then burnt away with a flame having a high oxygen content and in this way the internal temperature is gradually brought to approximately 300–450° C. The remaining ammonium salts then also evaporate. The resin burns away when the final temperature is reached, and a slag of non-catalytic impurities mixed with coke is deposited on the honey-yellow catalyst melt, it being possible to remove this slag with a perforated ladle. The catalyst melt free from resins and ammonium salts which is thus obtained, after cooling and acidification with hydrochloric acid, can be again mixed with such a quantity of water that 35 liters of catalyst solution are formed. This catalyst solution, perhaps after filtration, has a composition and capacity which corresponds to those of the catalyst solution originally used.

Example 2

A gas flame having an excess of air burns in the lower portion of a rotating quartz tube which has a length of about 2 meters and an internal diameter of about 20 cm., the tube having an inclination of approximately 3°. The resinous inactivated catalyst solution described in Example 1 flows as a uniform continuous stream at a velocity of approximately 50 liters per hour into the upper portion of the tube, in which a number of baffle members are disposed for increasing the residence time. The flame is so adjusted that, after the catalyst has passed through the first third of the tube, the catalyst has been distributed in the form of a thin film on the surface of the rotary furnace and the discharge temperature from the latter is about 350–450° C. The melt discharging from the tube is contaminated by finely divided coke and is led directly and while stirring into water having a temperature of 80° C. so that a catalyst solution with a concentration of about 400 g. of copper per liter is continuously formed. After acidification, the impurities are filtered off from this catalyst solution. The regenerated catalyst thus obtained has a capacity of about 40 g. of acrylonitrile per hour and per kg. of copper.

We claim:

A process for the regeneration of aqueous cuprous chloride catalysts inactivated by use in the synthesis of acrylonitrile from acetylene and hydrocyanic acid which comprises heating the aqueous cuprous chloride solution containing the inactivated catalyst at a temperature of up to about 200° C. to dehydrate the solution and removing the resins separating out on the surface of the melt thereby formed by heating the same with an oxidizing flame at a temperature of up to about 500° C. to burn off said resins.

References Cited in the file of this patent

UNITED STATES PATENTS

| | | |
|---|---|---|
| 1,598,967 | Hiller | Sept. 7, 1926 |
| 2,709,177 | Porret | May 24, 1955 |
| 2,748,157 | Taylor | May 29, 1956 |